US 6,668,063 B2

(12) United States Patent
Cimaz et al.

(10) Patent No.: US 6,668,063 B2
(45) Date of Patent: Dec. 23, 2003

(54) ELECTRICAL APPARATUS WITH ELECTRO-ACOUSTIC TRANSDUCER

(75) Inventors: Lionel Cimaz, Servon sur Vilaine (FR); Laurent Steenackers, Rennes (FR); Christian Bernard Gautier, Rennes (FR); Philippe Organo, Rennes (FR)

(73) Assignee: Mitsubishi Electric Telecom Europe, Nanterre (FR)

( * ) Notice: Subject to any disclaimer, the term of this patent is extended or adjusted under 35 U.S.C. 154(b) by 138 days.

(21) Appl. No.: 10/091,404

(22) Filed: Mar. 7, 2002

(65) Prior Publication Data

US 2002/0126865 A1 Sep. 12, 2002

(30) Foreign Application Priority Data

Mar. 9, 2001 (FR) .............................. 01 03264

(51) Int. Cl.[7] .............................. H04M 1/00; H04R 1/02
(52) U.S. Cl. .................. 381/345; 381/386; 379/433.02
(58) Field of Search ...................... 379/428.01, 428.02, 379/428.04, 429, 431, 433.01, 433.02; 381/357, 386, 361, 162, 345, 351; 455/90, 575

(56) References Cited

FOREIGN PATENT DOCUMENTS

| EP | 0 909 110 | 4/1999 |
| GB | 2 337 396 | 11/1999 |
| WO | WO 00/21330 | 4/2000 |

*Primary Examiner*—Rexford Barnie
(74) *Attorney, Agent, or Firm*—Oblon, Spivak, McClelland, Maier & Neustadt, P.C.

(57) ABSTRACT

The electrical apparatus (10) in particular a telephone comprises a box (12) and an electro-acoustic transducer (16) disposed in said box (12). Said box (12) comprises a bearing zone (25) supporting an ear of a user, said bearing zone (25) comprising an exit aperture (26) of said electro-acoustic transducer (16). Said box (12) furthermore comprises a decompression aperture (32) made through said bearing zone (25). The electrical apparatus (10) comprises an essentially sealed resonant enclosure (18), inside which is disposed said electro-acoustic transducer (16). Said enclosure (18) comprises an interference aperture (28) made through a wall (20) of said enclosure, and a leakage aperture (30) linking said rear volume (24) to the outside. Said interference aperture (28) emerges through said bearing zone (25). Said leakage aperture (30) emerges through a zone separate from said bearing zone (25). Said decompression aperture (32) emerges outside said enclosure (18).

10 Claims, 1 Drawing Sheet

ELECTRICAL APPARATUS WITH ELECTRO-ACOUSTIC TRANSDUCER

FIELD OF INVENTION

The present invention relates to an electrical apparatus comprising a box and an electro-acoustic transducer disposed in said box and exhibiting an active emission surface, said box comprising a bearing zone supporting an ear of a user, said bearing zone comprising an exit aperture of said electro-acoustic transducer, formed facing said active emission surface of said electro-acoustic transducer, said box furthermore comprising a decompression aperture made through said bearing zone.

Such an electrical apparatus is for example a mobile telephone. The electro-acoustic transducer is intended to reproduce the sound or speech messages received by the telephone.

BACKGROUND OF INVENTION

In known mobile telephones, the electro-acoustic transducer is disposed directly inside the box of the telephone. The exit aperture of the electro-acoustic transducer is made in an outside wall of the box. This aperture allows the transmission of the acoustic wave from the transducer to the ear of the user. The wall through which the exit aperture of the electro-acoustic transducer is made forms the bearing zone for supporting the ear of the user.

Moreover, in this same bearing zone is made a decompression aperture enabling the pinna of the ear of the user to be placed in communication with the inside of the box or the ambient air. This decompression aperture ensures a balancing of the pressures between the ear of the user and the inside of the box or the ambient air. The decompression aperture caters only for a flow rate-pressure conversion in respect of the air stream produced by the transducer, Pressure balancing is made possible by the intrinsic leaks present through the box. These leaks are formed at the level of the joints between the elements assembled to constitute the box, as well as through the passages defined in the box for the buttons of the keypad of the mobile telephone.

Such an electrical apparatus normally exhibits fairly mediocre acoustic qualities. In particular, it is very sensitive to variations in the contact leaks arising at the interface between the ear and the bearing zone supporting the ear on the box. These variations in the contact leaks in this region lead to variations in the frequency response which are highly prejudicial to listening quality.

In order to afford the user good acoustic quality, it is often necessary to implement an analogue or digital filtering of the signals received and addressed to the electro-acoustic transducer.

An aim of the invention is to propose an electrical apparatus comprising an electro-acoustic transducer disposed in the box, making if possible to obtain a frequency response of good quality and a weak sensitivity to variations in contact leaks formed between the ear and the box, without it being necessary to implement analogue or digital processing of the signal addressed to the transducer.

SUMMARY OF INVENTION

Accordingly, the subject of the invention is an electrical apparatus, of the aforesaid type, characterized in that said electrical apparatus comprises an essentially sealed resonant enclosure, inside which is disposed said electro-acoustic transducer, said enclosure delimiting a rear volume for said electro-acoustic transducer, in that said enclosure comprises an interference aperture made through a wall of said enclosure and a leakage aperture linking said rear volume to the outside of said enclosure, said interference aperture emerging outside said enclosure through said bearing zone, said leakage aperture emerging through a zone separate from said bearing zone, and in that said decompression aperture emerges outside said enclosure.

According to particular embodiments, the electrical apparatus comprising one or more of the following characteristics:

- said wall of said enclosure constitutes at least a part of said bearing zone of said box;
- said exit aperture of said electro-acoustic transducer is made through a wall delimiting both said enclosure and said box in a region of said bearing zone;
- said exit aperture of said electro-acoustic transducer is made through a wall specific to said enclosure, said wall lying inside said box, and said exit aperture of said electro-acoustic transducer emerges inside an intermediate chamber of said box, said intermediate chamber being delimited at the rear of said decompression aperture made in said box;
- said exit aperture of said electro-acoustic transducer and said decompression aperture are substantially aligned;
- it comprises at least one tubular span extending at least one of said interference aperture, of said leakage aperture, of said exit aperture of said electro-acoustic transducer and of said decompression aperture;
- at least one of said interference aperture, of said leakage aperture, of said exit aperture of said electro-acoustic transducer and of said decompression aperture comprises at least two disjoint orifices;
- said electro-acoustic transducer is a loudspeaker;
- the effective surface area of said interference aperture is substantially comprised between 0.1 mm$^2$ and 1.6 mm$^2$.
- the effective surface area of said leakage aperture is greater than the effective surface area of said interference aperture;
- the ratio of said effective surface area of said leakage aperture to said effective surface area of said interference aperture is substantially comprised between 1 and 8;
- the ratio of the effective surface area of said decompression aperture to the effective surface area of said interference aperture is substantially greater than 16; and
- it belongs to the group comprising:
  a telephone; and
  a portable electronic diary.

BRIEF DESCRIPTION OF THE DRAWINGS

The invention will be better understood on reading the description which follows, given merely by way of example and while referring to the drawings in which.

DETAILED DESCRIPTION

Figure 1:
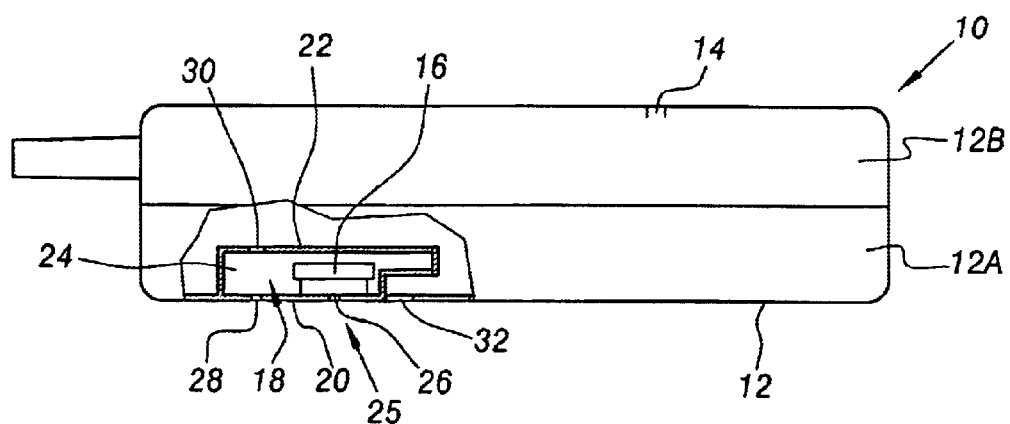
FIG. 1 is a diagrammatic side view with partial cutaway of a mobile telephone according to the invention.

The mobile telephone 10 represented in FIG. 1 comprises a box 12 forming the outer casing of the mobile telephone. This box is formed for example by two half-shells 12A, 12B assembled together along a peripheral function line.

On its front face the box exhibits a set of orifices forming the passage for the buttons of a keypad. The orifices for the passage of the buttons and the junction line formed between the two half-shells are the origin of leaks intrinsic to the box. These leaks place the inside of the box permanently in communication with the ambient environment.

By way of illustration, these intrinsic leaks are shown diagrammatically by a single aperture 14 made artificially on the bottom of the box.

The mobile telephone 10 comprises an electro-acoustic transducer 16 disposed inside the box 12. The electro-acoustic transducer 16 comprises in particular a first part 16A consisting of a basket and a second part 16B consisting of a diaphragm. This diaphragm is turned towards the front wall of the box 12. The electro-acoustic transducer 16 consists for example of a loudspeaker. It is adapted for the sound reproduction of music or speech signals received by the mobile telephone. According to the invention, the electro-acoustic transducer 16 is disposed inside an essentially sealed enclosure 18. This enclosure is disposed completely inside the box 12. The enclosure 18 is partially delimited by a wall 20 common to the box 12 and to the enclosure 18.

According to a variant embodiment (not represented), the enclosure and the second part of the electro-acoustic transducer are disposed away from the front wall of the box. The corresponding enclosure can then envelope only the first part of the electro-acoustic transducer.

Furthermore, the enclosure 18 is delimited by an inner wall 22 specific to the enclosure. The inner wall 22 lies completely inside the box 12 and is separate from the outer walls of the box.

In variant embodiments (not represented), at least a part of several walls of the enclosure is common with a part of several walls of the box.

The enclosure 18 delimits a rear volume 24 in contact with the opposite surface from the active emission surface of the loudspeaker constituting the transducer 16.

Externally the box 12 delimits a bearing zone 25 for supporting an ear of a user. The bearing zone 25 is formed partially by the wall 20 common to the box 12 and to the enclosure 18. The bearing zone 25 is furthermore formed by a front wall part specific to the box.

An exit aperture 26 of the electro-acoustic transducer 16 passes through the bearing zone 25 supporting the ear of the user. This exit aperture 26 is formed through the wall 20 facing the active emission surface of the transducer, that is to say facing the active surface of the diaphragm of the loudspeaker in the example given.

According to a variant embodiment (not represented), the second part of the electro-acoustic transducer is situated facing the exit aperture specific to the box. In a first case according to which the enclosure envelopes only the first part of the electro-acoustic transducer, an exit aperture is provided within the frontal wall of the enclosure at the level of the rear region of the second part of the electro-acoustic transducer. In this first case, the exit aperture specific to the enclosure is a hole exhibiting a surface area corresponding to the surface area required for the passage of the second part of the electro-acoustic transducer. In a second case, the enclosure comprises an exit aperture provided on its frontal wall, at the level of the second part of the electro-acoustic transducer. However, the exit aperture cut in the enclosure exhibits a much smaller surface area than that of the corresponding exit aperture of the first aforesaid case.

According to another variant (not represented), the enclosure is disposed away-from the front wall of the box and only the second part of the transducer is designed in direct proximity to the front wall of the box facing the exit aperture provided within the box. In this variant, the enclosure envelopes only the first part of the transducer.

The exit aperture 26 consists for example of a single circular orifice whose diameter is substantially equal to 1 mm. This orifice is covered by a trellis forming an acoustic fabric. This trellis is 51% open. Thus, the effective surface area of the exit aperture 26, that is to say the free surface area allowing the actual passage of sound is substantially equal to 0.4 mm$^2$.

The enclosure 18 forms a resonant enclosure ensuring a function of filtering the sound message emitted. Accordingly, an interference aperture 28 is made through the bearing zone 25 supporting the ear of the user. This interference aperture 28 ensures that the inside of the enclosure 18 is placed in communication with the inside of the auditory pinna of the ear when the telephone is held right up against the ear of a user.

The interference aperture 28 is formed for example of a single circular orifice. The diameter of this orifice is preferably between 0.5 and 2 mm and is advantageously substantially equal to 1 mm.

This interference aperture is covered by a trellis forming an acoustic fabric, masking 51% of the interference aperture 28.

Thus, the effective surface area of the interference aperture is between 0.1 mm$^2$ and 1.6 mm$^2$ approximately. It is preferably approximately 0.4 mm$^2$.

Advantageously, the effective surface areas of the interference aperture 28 and of the exit aperture 26 are substantially identical.

Furthermore, passing through the inner wall 22 of the enclosure la is a leakage aperture 30 ensuring that the inside of the enclosure 18 is placed permanently in communication with the outside of the enclosure 18 by passing through a zone separate from the bearing zone 25 supporting the ear of the user. Stated otherwise, this leakage aperture 30 enables the inside of the rear volume of the enclosure 18 to be made to communicate with the ambient environment outside the pinna zone of the ear of the user.

The leakage aperture 30 is for example aligned with the interference aperture 28. They are then formed in the opposite walls of the enclosure 18.

According to a variant in accordance with those indicated hereinabove, in addition to the part of the front wall common to the enclosure and to the box, at least one of the rear wall (with respect to the electro-acoustic transducer) and of a lateral waif of the enclosure is common with a part of the rear or lateral wail of the box. The leakage aperture is provided on a part of the rear or lateral wall of the box (also constituting a wall of the enclosure), The leakage aperture 30 is for example formed of a single circular orifice whose diameter is substantially equal to 1.1 mm. This orifice is devoid of trellis partially masking it. Thus, its effective surface area is substantially equal to 0.95 mm$^2$.

Preferably, the leakage aperture 30 has a larger effective surface area than the effective surface area of the interference aperture 28. In particulars the ratio of the effective surface area of the leakage aperture 30 to the effective surface area of the interference aperture 28 is between 1 and 8 approximately. It is preferably substantially equal to 2.

The enclosure 18 emerging only through the interference aperture and the leakage aperture 30 creates a resonant interference filter. This filter makes it possible to eliminate the two spikes normally encountered in the frequency response of the electro-acoustic transducer. For a given loudspeaker with an artificial ear referenced as being of the 3.2 low leak type according to recommendations P.57 of the ITU-t (International Telecommunication Union) standard of August 1996, the spikes correspond approximately to the frequencies 1.5 kHz and 3.5 kHz.

The resonant filter thus created is a low-pass filter. While operating, only a part of the filtered rear wave emanating from the electro-acoustic transducer 16 is reinjected inside the pinna of the ear through the interference aperture 28. This reinjection is carried out as a function of the ratio defined by the effective surface area of the interference aperture 28 to the effective surface area of the leakage aperture 30.

Thus, partial destructive interference is created in the low frequency band.

The interference aperture 28 and leakage aperture 30 are dimensioned such that the resonant frequency of the filter lies between the two frequencies corresponding to the spikes.

In the neighborhood of the resonant frequency of the filter, the gain and the phase make it possible to reduce the overall acoustic pressure inside the ear for frequencies immediately below the resonant frequency. Likewise, they make it possible to increase the overall acoustic pressure for frequencies just above the resonant frequency. Thus, by correct adjustment of the resonant frequency of the filter, the first spike of the frequency response is attenuated and the second spike is increased.

The box 12 moreover exhibits a decompression aperture 32 made through the bearing zone 25 supporting the ear. This decompression aperture 32 caters for the link between the outside of the enclosure 18 and the auditory pinna of the ear when the telephone is applied against the ear.

The decompression aperture 32 emerges outside the enclosure 18, passing through the inside of the box 12.

The action of this decompression aperture 32 is to convert the flow rate of the air stream produced by the electro-acoustic transducer 16 into a variation in pressure applied to the eardrum without excessively compressing the ear of the user.

The assembly formed by the electro-acoustic transducer 16 and by the decompression aperture 32 thus constitutes a pressure generator rather than a flow rate generator.

The presence of the decompression aperture 32 makes it possible to eliminate the decreasing frequency response at a relatively strong level for the low frequencies and at a relatively weak level for the high frequencies. For a given loudspeaker with an artificial ear referenced as being of the 3.2 low leak type according to ITU standard P.57 (international Telecommunication Union), the reduction is 30 dB between 300 Hz and 3 Khz for example.

Moreover, the decompression aperture 32 reduces the sensitivity to variations in contact leaks between the ear of the user and the bearing zone 25. Accordingly, the effective surface area of the decompression aperture 32 is much greater than the mean open surface area formed by the contact leaks between the ear and the bearing zone. The mean open surface area is taken for example to be equal to that defined in the standard ear of the 3.2 low leak type in the ITU standard (standing for International Telecommunication Union) P.57.

Preferably the effective surface area of the decompression aperture 32 is four times the mean open surface area of the contact leaks.

The decompression aperture 32 is formed for example by a single circular orifice whose diameter is substantially equal to 4 mm Advantageously, the ratio of the effective surface area of the decompression aperture 32 to the effective surface area of the interference aperture 28 is greater than 16.

In practice, the length of each aperture, that is; to say normally the thickness of the walls in which the apertures are made is very important to the acoustic qualities of the sound restitution. In particular, this length of the apertures influences the resonant frequency of the filter and its quality factor.

If the thickness of the walls is insufficient, each aperture is extended by a tubular span increasing the total length of the aperture. Such a tubular span is adapted so that the total length of each aperture is between 1 mm and 2.5 mm.

Figure 2:
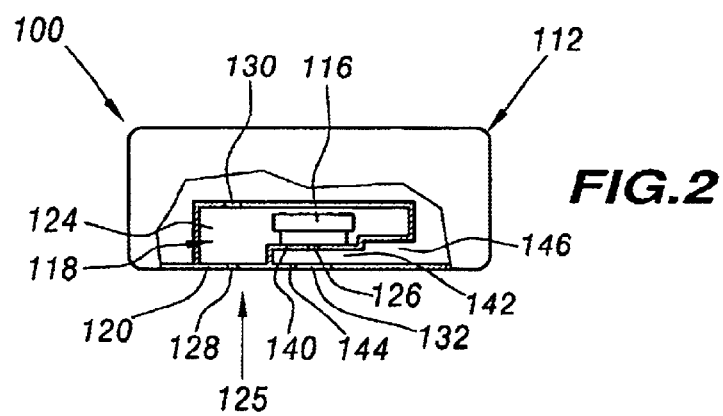
FIG. 2 is an end-on view with partial cutaway of a variant embodiment of the mobile telephone according to the invention.
Figure 3:
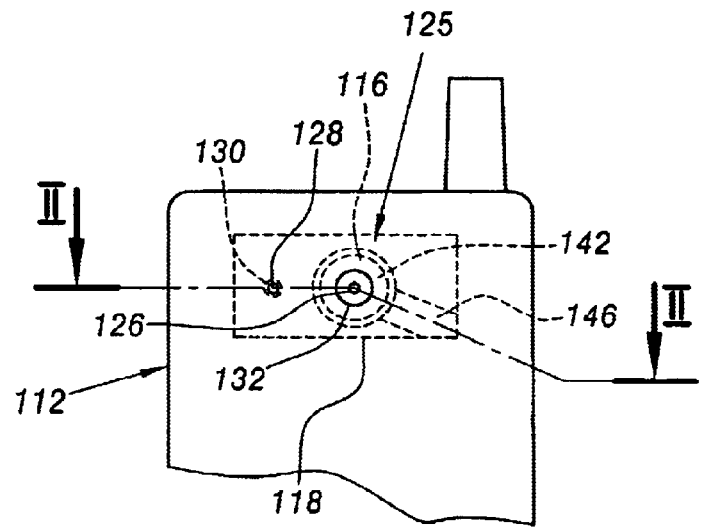
FIG. 3 is an external front view of the mobile telephone of FIG. 2.

Represented in FIGS. 2 and 3 is a variant embodiment of the mobile telephone of FIG. 1. In this embodiment, elements identical or similar to those of FIG. 1 are designated by the same reference numbers to which 100 has been added.

Thus, the telephone 100 comprises a box 112 inside which is provided an enclosure 118 containing an electro-acoustic transducer 116. The enclosure 118 opens through the bearing zone 125 supporting an ear via an interference aperture 128. A leakage aperture 130 caters for the link between the rear volume 124 delimited by the enclosure 118 and the inside of the box 112.

In this embodiment, the exit aperture 126 of the electro-acoustic transducer is made on a wall 140 specific to the enclosure 118, this wall not constituting an outer wall of the box 112.

The wall 140 thus lies inside the box 112. The exit aperture 126 of the transducer emerges into an intermediate chamber 142 delimited between the wall 140 specific to the enclosure and an outer wall 144 of the box 112. The wall 144 is a part of the bearing zone 120 supporting the ear of the user.

The intermediate chamber 142 is linked to the inside of the box 112 by a conduit 146 formed between the walls 140 and 144.

Passing through the wall 144 is the decompression orifice 132, which opens into the intermediate chamber 142. Advantageously, the exit orifice 126 of the transducer is substantially aligned with the decompression orifice 132.

Regardless of the embodiment envisaged, the presence of the sealed enclosure linked, on the one hand, to the pinna of the ear by the interference orifice and, on the other hand, to the outside of the enclosure by the leakage orifice, this being in the presence of the decompression orifice linking the ear to the outside of the enclosure makes it possible to satisfy, without requiring prior processing of the electro-acoustic transducer excitation signal, the conditions imposed by the specifications 11.10 phase 2+ GSM (standing for Global System for Mobile) with the standard ear of 3.2 low leak type of the ITU P.57 standard mentioned earlier.

In particular, by employing a filter-forming enclosure it is possible to obtain a satisfactory frequency response and to reduce the sensitivity to variations in contact leaks between the ear and the bearing zone of the box.

As a variants each of the apertures can be formed by at least two disjoint orifices constituting several independent holes. In this case, the total effective surface area of the independent orifices is equal to the effective surface area envisaged for the corresponding aperture.

By employing several disjoint orifices it is possible in particular to improve the visual appearance of the box of the telephone whilst possibly complying with symmetries.

The invention can be implemented for any type of electrical apparatus comprising an electro-acoustic transducer such as a mobile telephone or a portable electronic diary.

What is claimed is:

1. An electrical apparatus comprising a box and an electro-acoustic transducer disposed in said box and having an active emission surface, said box comprising a bearing zone configured to support an ear of a user and a decompression aperture made through said bearing zone, said bearing zone comprising an exit aperture relative to said electro-acoustic transducer and facing said active emission surface, said electrical apparatus comprising:
   a sealed resonant enclosure comprising,
      a rear volume configured to house said electro-acoustic transducer,
      an interference aperture in a first wall of said sealed resonant enclosure and configured to emerge outside said sealed resonant enclosure through said bearing zone, and
      a leakage aperture configured to link said rear volume to the outside of said sealed resonant enclosure and configured to emerge through a zone separate from said bearing zone, wherein
         said decompression aperture is configured to emerge outside said sealed resonant enclosure.

2. The apparatus of claim 1, wherein said first wall of said sealed resonant enclosure comprises:
   at least a part of said bearing zone of said box.

3. The apparatus of claim 2, wherein said exit aperture relative to said electro-acoustic transducer comprises:
   an opening in a second wall delimiting both said sealed resonant enclosure and said box in a region of said bearing zone.

4. The apparatus of claim 2, wherein said exit aperture relative to said electro-acoustic transducer comprises:
   an opening in a third wall specific to said sealed resonant enclosure and inside said box such that said exit aperture relative to said electro-acoustic transducer emerges inside an intermediate chamber of said box, said intermediate chamber being delimited at the rear of said decompression aperture made in said box.

5. The apparatus of claim 4 wherein said exit aperture relative to said electro-acoustic transducer and said decompression aperture are substantially aligned.

6. The apparatus of claim 1, further comprising:
   at least one tubular span extending from one of said interference aperture, said leakage aperture, said exit aperture relative to said electro-acoustic transducer, and said decompression aperture.

7. The apparatus of claim 1, wherein said electro-acoustic transducer comprises:
   a loudspeaker.

8. The apparatus of claim 1, wherein said interference aperture comprises:
   an effective surface area being substantially comprised between $0.1$ mm$^2$ and $1.6$ mm$^2$.

9. The apparatus of claim 1, wherein said leakage aperture, said interference aperture and said decompression aperture, comprise:
   an effective surface area of said leakage aperture, an effective surface area of said interference aperture and an effective surface decompression aperture, respectively, wherein
      a ratio of said effective surface area of said leakage aperture to said effective surface area of said interference aperture is substantially comprised between 1 and 8, and
      a ratio of said effective surface area of said decompression aperture to said effective surface area of said interference aperture is substantially greater than 16.

10. The apparatus of claim 1, comprising at least one of:
a telephone; and
a portable electronic diary.

* * * * *